United States Patent
Kenevan

(10) Patent No.: US 8,827,351 B1
(45) Date of Patent: Sep. 9, 2014

(54) TRACTOR-TRAILER CROSS WIND BLOCKER

(71) Applicant: Timothy Kenevan, Kettle Falls, WA (US)

(72) Inventor: Timothy Kenevan, Kettle Falls, WA (US)

(*) Notice: Subject to any disclaimer, the term of this patent is extended or adjusted under 35 U.S.C. 154(b) by 0 days.

(21) Appl. No.: 13/974,929

(22) Filed: Aug. 23, 2013

Related U.S. Application Data

(63) Continuation-in-part of application No. 12/962,448, filed on Dec. 7, 2010, now Pat. No. 8,517,452.

(51) Int. Cl.
*B62D 35/00* (2006.01)

(52) U.S. Cl.
CPC .......... *B62D 35/001* (2013.01); *Y10S 180/903* (2013.01)
USPC .............. 296/180.4; 296/180.1; 296/180.5; 180/903

(58) Field of Classification Search
CPC .. B62D 35/001; B62D 35/005; B62D 35/008; B62D 37/02
USPC ........ 296/180.1–180.5; 180/903; 105/1.1, 1.3
See application file for complete search history.

(56) References Cited

U.S. PATENT DOCUMENTS

| | | | |
|---|---|---|---|
| 2,193,156 A | 3/1940 | Antoine | |
| 2,863,695 A | 12/1958 | Stamm | |
| 3,241,876 A | 3/1966 | Saunders | |
| 3,348,873 A | 10/1967 | Saunders | |
| 3,711,146 A | 1/1973 | Madzsar et al. | |
| 3,834,752 A | 9/1974 | Cook et al. | |
| 4,262,953 A | 4/1981 | McErlane | |
| 4,458,937 A | 7/1984 | Beckmann et al. | |
| D277,840 S | 3/1985 | Jacques | |
| 4,518,188 A * | 5/1985 | Witten | 296/180.2 |
| 4,560,195 A | 12/1985 | Price et al. | |
| 4,904,015 A * | 2/1990 | Haines | 296/180.3 |
| 5,078,448 A | 1/1992 | Selzer et al. | |
| 5,190,342 A | 3/1993 | Marlow et al. | |
| 5,685,597 A | 11/1997 | Reid | |
| 6,428,084 B1 | 8/2002 | Liss | |
| 6,485,087 B1 | 11/2002 | Roberge | |
| 6,585,312 B2 | 7/2003 | Jain | |
| 6,644,720 B2 | 11/2003 | Long et al. | |
| 6,854,788 B1 | 2/2005 | Graham | |
| 7,073,845 B2 | 7/2006 | Ortega et al. | |
| 7,374,229 B1 * | 5/2008 | Noll et al. | 296/180.2 |
| 7,497,502 B2 | 3/2009 | Wood | |
| 7,604,284 B2 | 10/2009 | Reiman et al. | |
| 7,712,822 B2 | 5/2010 | Pfaff | |
| 7,740,303 B2 | 6/2010 | Wood | |
| 8,099,832 B1 | 1/2012 | Shuker | |
| 2003/0030300 A1 | 2/2003 | Jain | |

(Continued)

*Primary Examiner* — Glenn Dayoan
*Assistant Examiner* — Jason S Daniels
(74) *Attorney, Agent, or Firm* — Kenneth L. Green

(57) ABSTRACT

A tractor-trailer fairing for blocking cross-winds is inexpensive, attaches to a forward face of the trailer, is adjustable to the gap between the tractor and trailer, and is easily moved between trailers. The fairing comprises two pairs of identical upper and lower curved panels independently attached to opposing front corners of the trailer. The panels slide down over pins attached to brackets permanently mounted to the trailer. Pairs of adjustable diagonal struts reach from a forward face of the trailer to each of the curved panels to hold the panels in position. Flaps attach to the forward edges of the panels at about a 90 degree angle and restricts the cross-winds from passing between the panels and tractor cab.

17 Claims, 10 Drawing Sheets

(56) References Cited

U.S. PATENT DOCUMENTS

| | | |
|---|---|---|
| 2004/0075298 A1* | 4/2004 | Wong et al. ................ 296/180.2 |
| 2006/0049665 A1 | 3/2006 | Graham |
| 2007/0200390 A1 | 8/2007 | Lotarev et al. |
| 2009/0179456 A1 | 7/2009 | Holubar |
| 2009/0184539 A1 | 7/2009 | Pursley |
| 2010/0072779 A1 | 3/2010 | Pfaff |
| 2010/0194143 A1* | 8/2010 | Perkins et al. ............ 296/180.2 |
| 2011/0148140 A1 | 6/2011 | Benton |

* cited by examiner

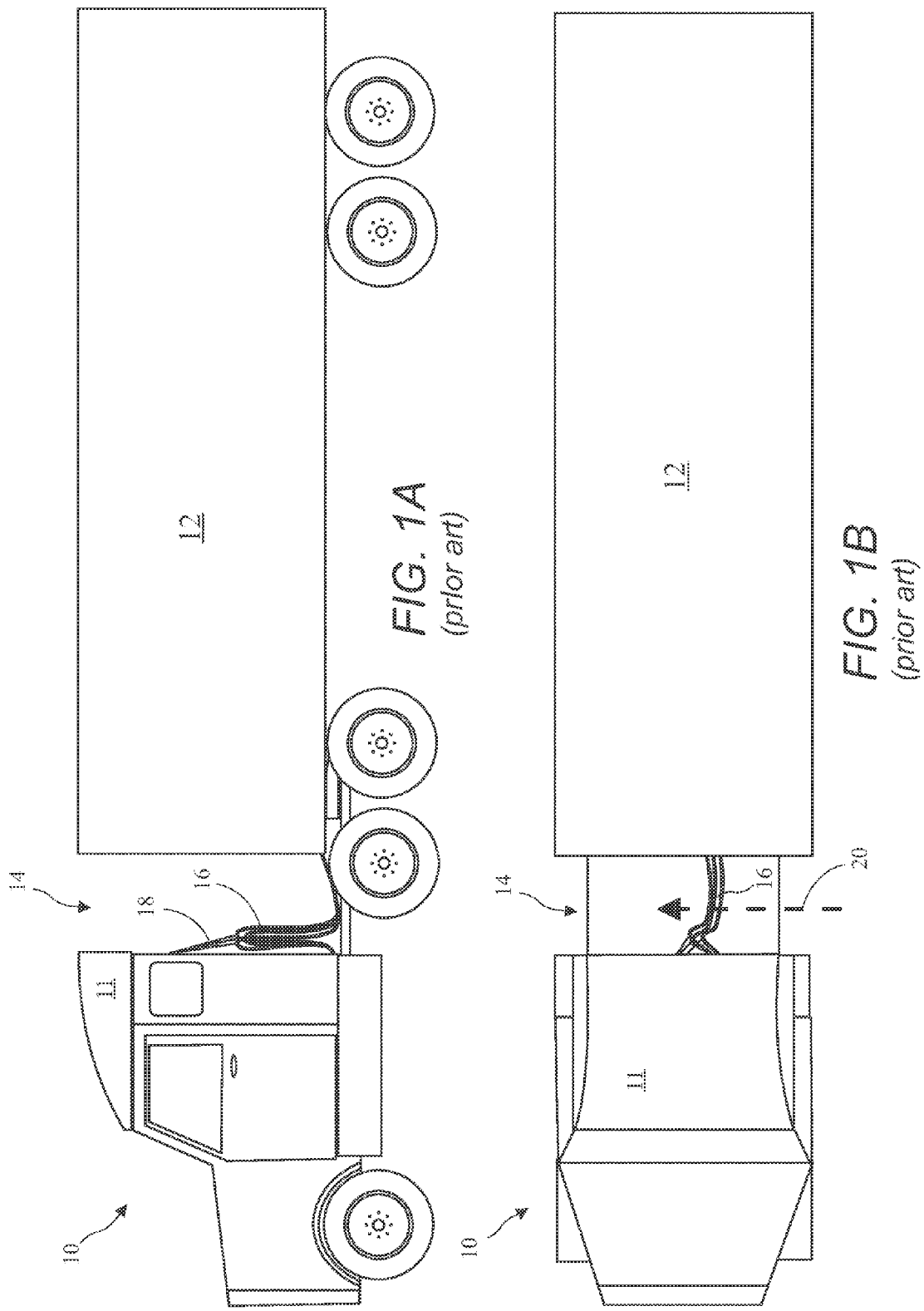

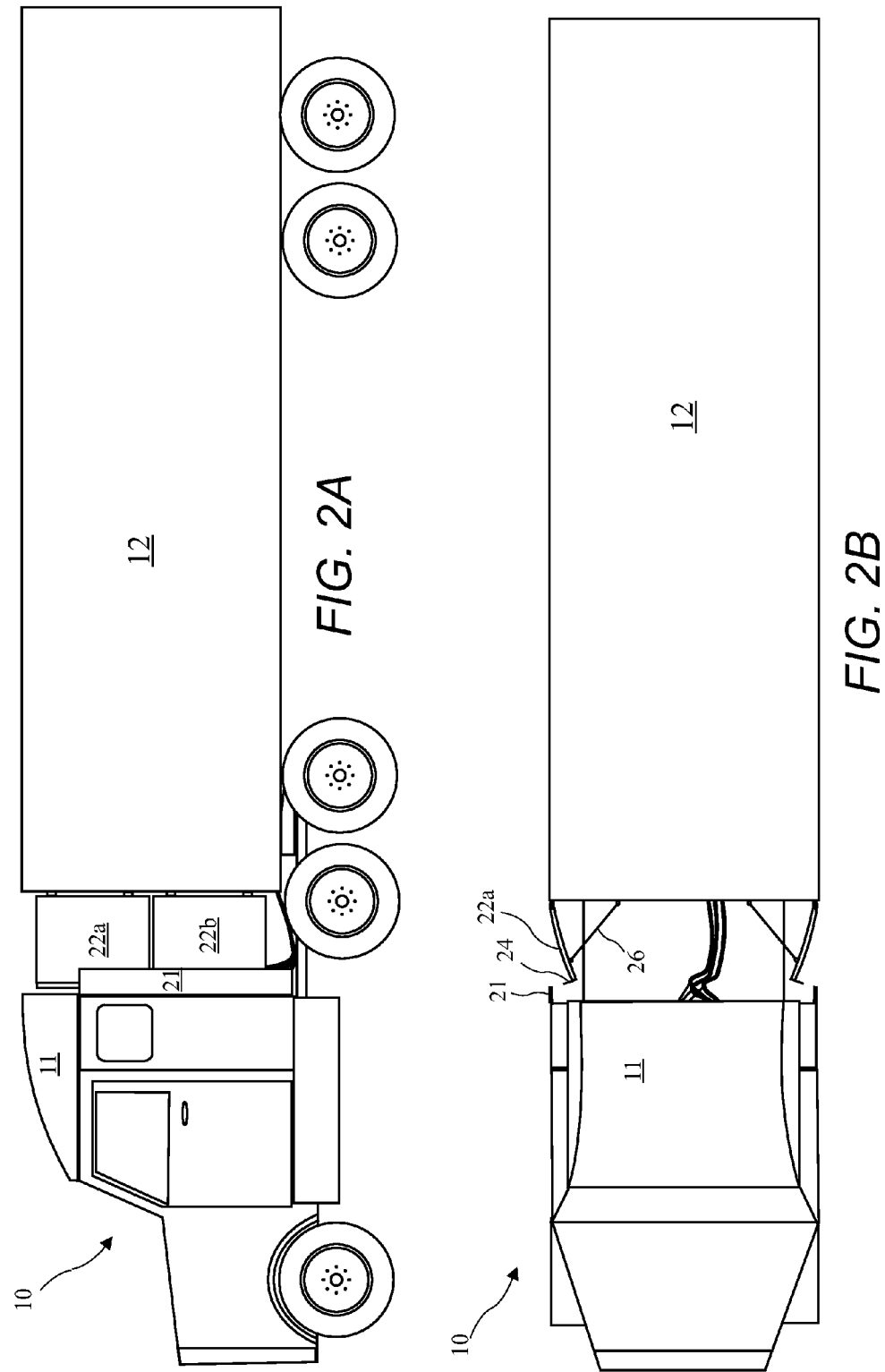

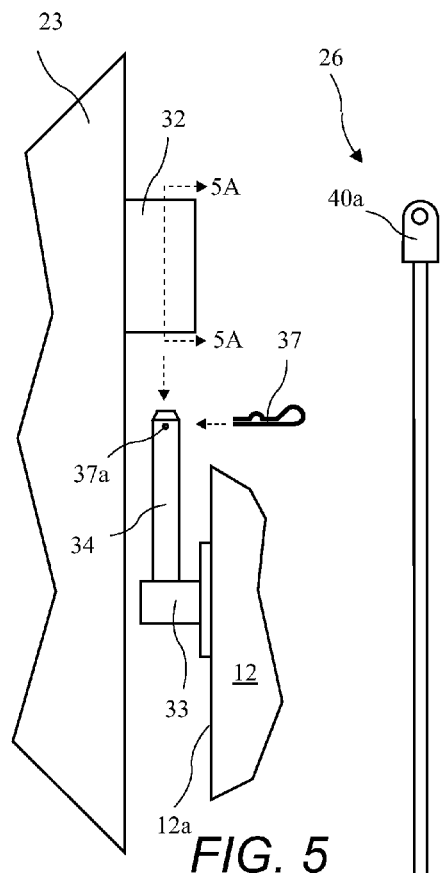
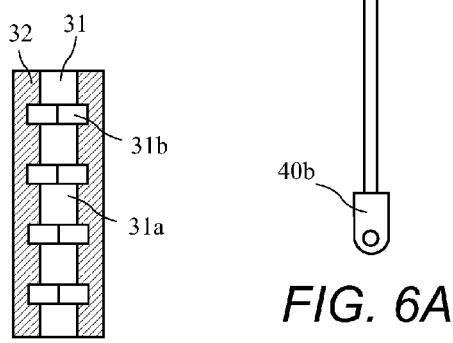
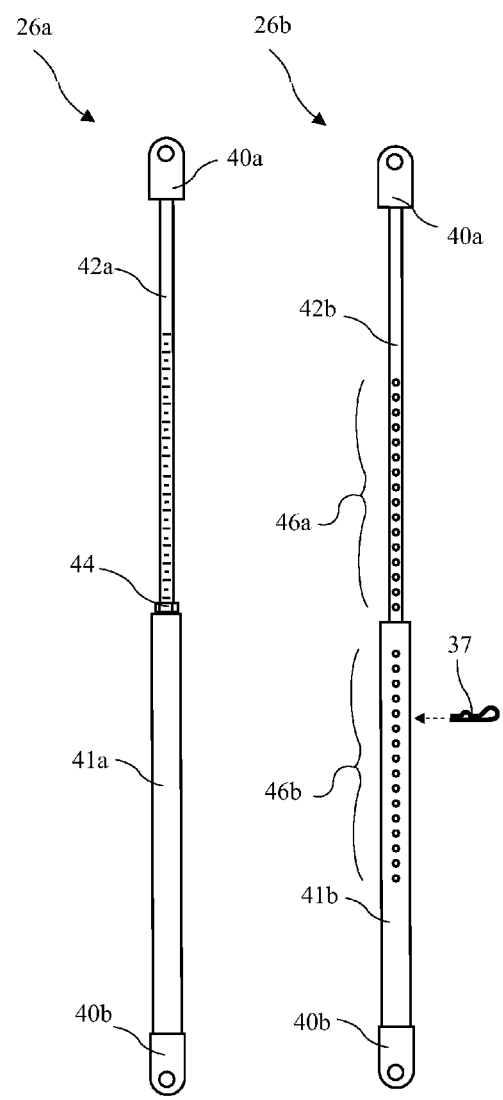
FIG. 5     FIG. 5A     FIG. 6A     FIG. 6B     FIG. 6C

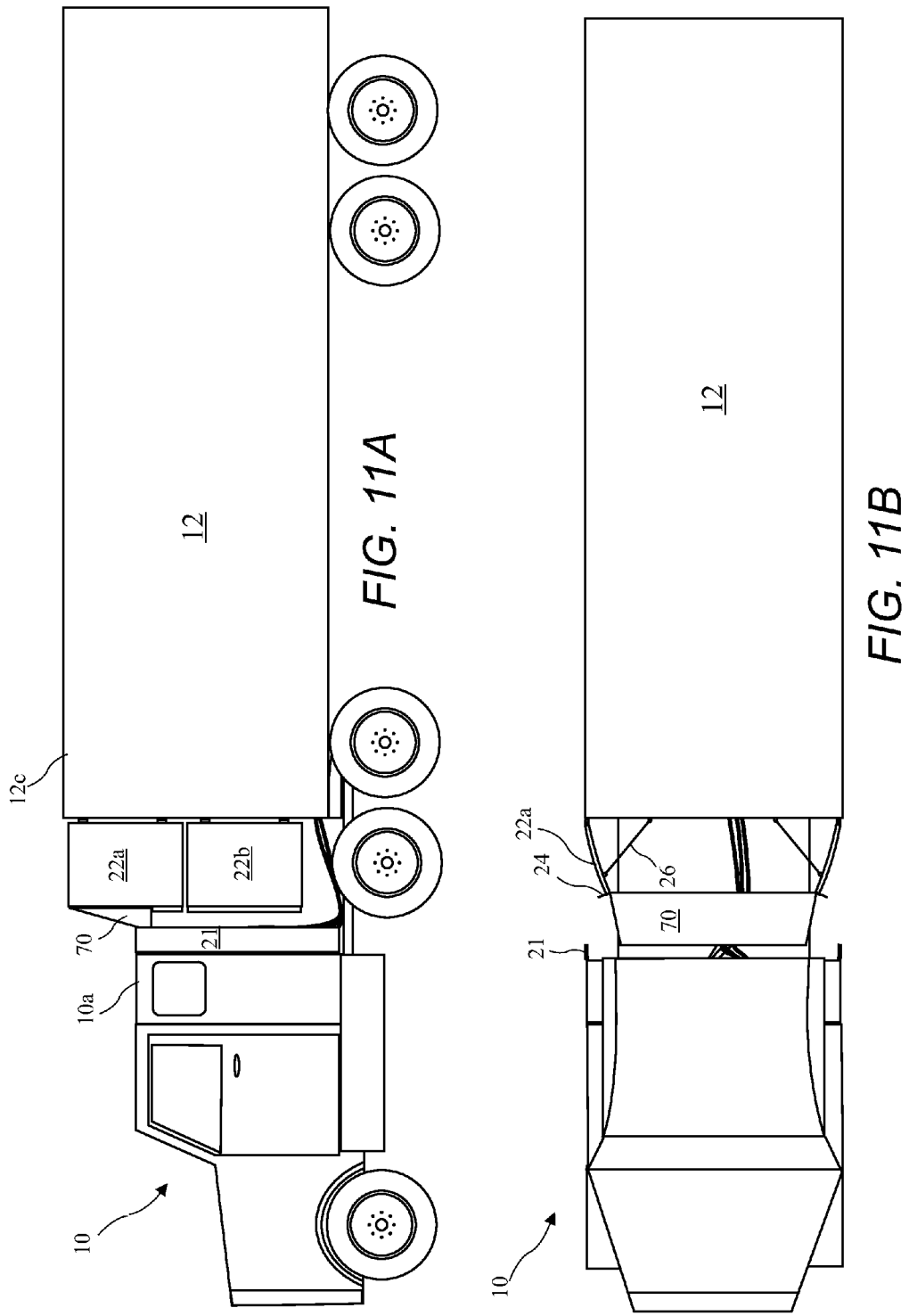

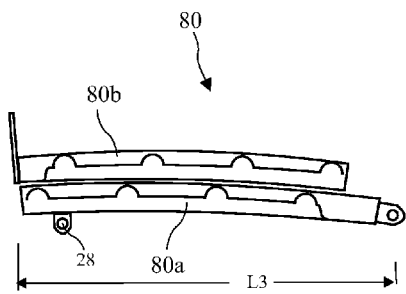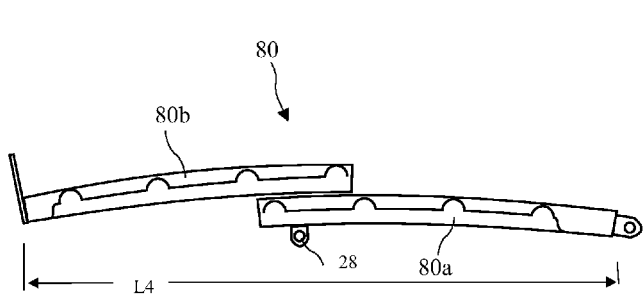
FIG. 13A          FIG. 13B
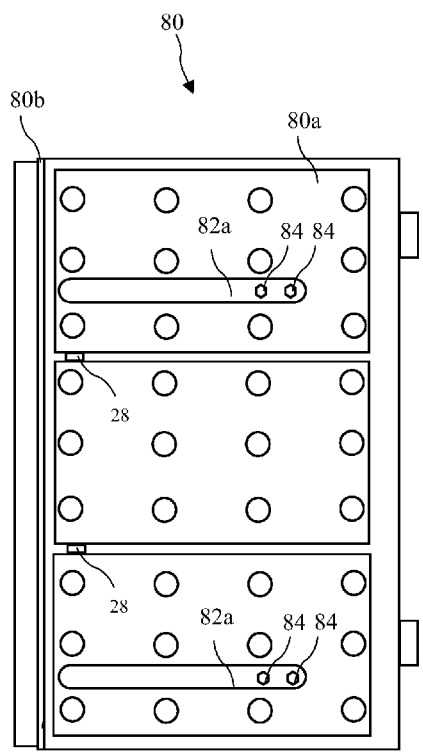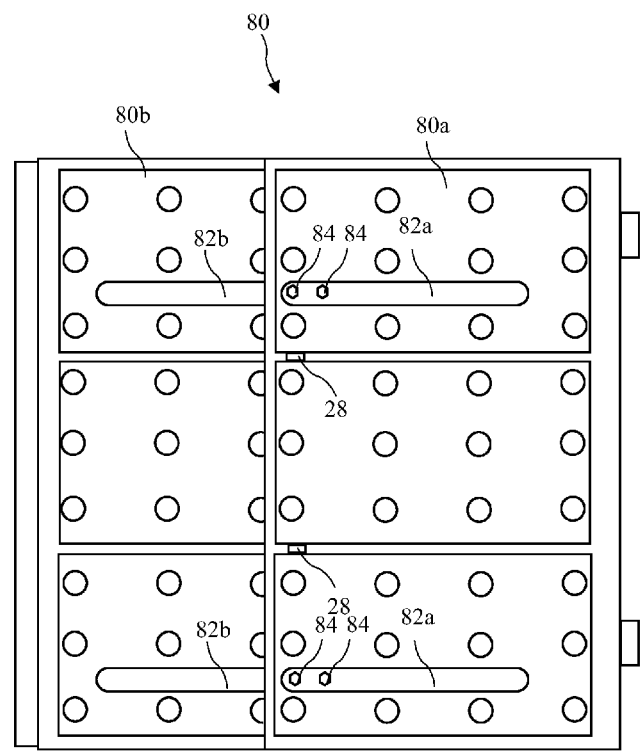
FIG. 12A          FIG. 12B

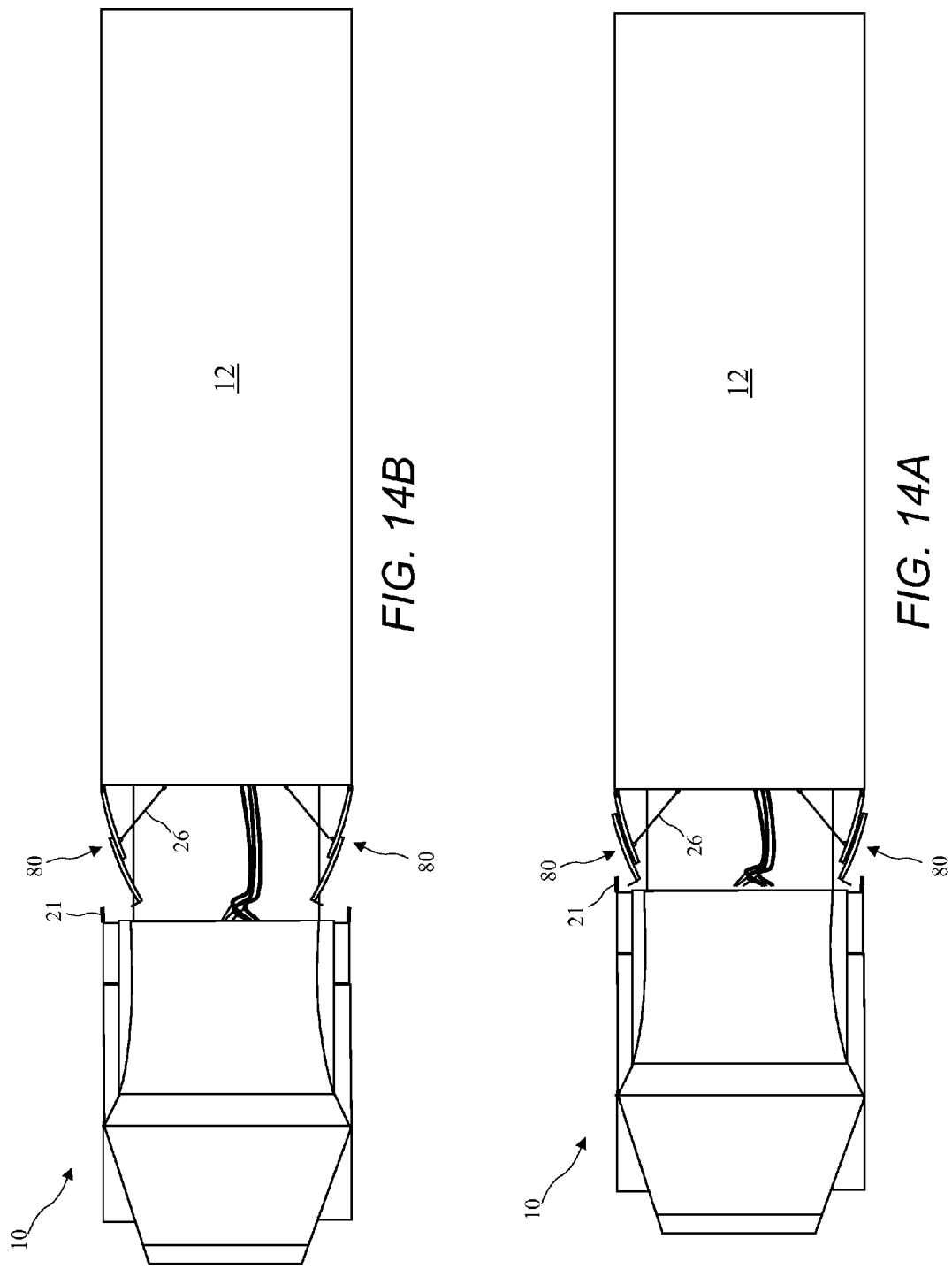

TRACTOR-TRAILER CROSS WIND BLOCKER

CROSS-REFERENCE TO RELATED APPLICATIONS

The present application is a Continuation In Part of U.S. patent application Ser. No. 12/962,448 filed Dec. 7, 2010, which application is incorporated in its entirety herein by reference.

BACKGROUND OF THE INVENTION

The present invention relates to reducing aerodynamic drag on tractor-trailer rigs and in particular to reducing drag created by the interaction of cross-winds with a gap between the tractor and trailer.

Tractor-trailer rigs (or semi-trailers) are a vital element of product distribution. In the United Sates, tractor-trailer rigs travel over 100 billion miles a year consuming over 20 billion gallons of diesel fuel. It has been estimated that almost 65 percent of the fuel burned is to overcome aerodynamic drag. As a result, even a small reduction in aerodynamic drag may have a significant impact on the demand for diesel fuel reducing the cost of shipping products. Additionally, a reduction in demand results in a lower price for diesel fuel, further reducing costs of all diesel fuel consumers.

Many attempts have been made to reduce the aerodynamic drag of tractor-trailer rigs. Generally, these attempts are directed to drag created by the motion of the tractor-trailer rigs through the ambient air. For example, sloped tops, side extender fairings and side skirt bottoms have been added to the tractors. However, feasible side extender fairings and side skirt bottoms cannot reach rearward to the trailer because they would interfere with turning without complicated mechanical apparatus for retracting the skirts. Extended side fairings also block access to hoses and cables attached to the back of the tractor cab and to the front of the trailer, making safety inspections difficult, and also block access to access doors on the front of the trailer if so equipped.

Some fairings are attached to the tractor such as disclosed in U.S. Pat. No. 2,863,695, U.S. Pat. No. 3,241,876, U.S. Pat. No. 3,348,873, U.S. Pat. No. 4,458,937, U.S. Pat. No. 5,078,448, and others. Unfortunately these fairings are overly complex, expensive, and/or fail to address drag due to cross-winds.

For over 50 years it has been known cross-winds contribute to total drag. Other patents address the drag created by cross-winds, including U.S. Pat. No. 7,073,845, for "Aerodynamic Drag Reduction Apparatus for Gap-Divided Bluff Bodies Such as Tractor-Trailers" discloses flat vertical panels attached to the leading face of the trailer and overlapping with flat vertical panels attached to the trailing face of the tractor. While the fairings of the '845 patent address cross-winds, they require precise fitting to the individual tractor and trailer and may interfere with pneumatic hoses and electrical cables connecting the braking, lighting, and refrigeration systems on the tractor-trailer.

Another patent, U.S. Pat. No. 7,604,284 for "Vehicle Fairing Structure" discloses a fairing attached to the leading edges of the trailer to direct air away from the gap between the tractor and trailer. The fairing of the '284 patent is fixed to the trailer and not adjustable. It is not easily transferred between trailers and generally a separate fairing is required for each trailer, and it cannot be adjusted when the fifth wheel is moved forward or backwards based on weight distribution.

While known fairings provide some benefit, they are overly complex, expensive, and/or require custom fitting, and a need remains for a simple low cost fairing providing reductions in drag to reduce fuel consumption.

BRIEF SUMMARY OF THE INVENTION

The present invention addresses the above and other needs by providing a tractor-trailer fairing for blocking cross-winds, which fairing is inexpensive, attaches to a forward face of the trailer, is adjustable to the gap between the tractor and trailer, and is easily moved between trailers. The fairing comprises two pairs of identical upper and lower curved panels independently attached to opposing front corners of the trailer. The panels slide down over pins attached to brackets permanently mounted to the trailer. Pairs of adjustable diagonal struts reach from a forward face of the trailer to each of the curved panels to hold the panels in position. Flaps attach to the forward edges of the panels at about a 90 degree angle and restricts the cross-winds from passing between the panels and tractor cab.

In accordance with one aspect of the invention, there are provided two pairs of vertically spaced panels blocking the flow of cross-winds between a tractor and trailer. Each panel is light weight preferably weighing between 20 and 25 pounds each allowing easy handling by a single individual and low cost shipping.

In accordance with another aspect of the invention, there are provided curved panels blocking the flow of cross-winds between a tractor and trailer. Each panel is attached to the trailer and curves inward as the panels reach towards the tractor. The inward curve allows greater clearance then the tractor turns.

In accordance with yet another aspect of the invention, there are provided panels having flexible flaps along forward edges of the panels blocking the flow of cross-winds between the tractor and trailer. The flexible flaps are preferably between eight inches and twelve inches wide and attached approximately 90 degrees to the forward edge of the panels and fill gaps between the panels and side extenders attached to the tractor cab. The flexible flaps are sufficiently stiff to block the flow of cross-winds between the tractor and trailer and are sufficiently flexible to bend if they come in contact with the side extenders, exhaust stacks, or other structure attached to the tractor.

In accordance with still another aspect of the invention, there are provided removable panels blocking the flow of cross-winds between a tractor and trailer. Each panel pivots at an end attached to a bracket attached to the trailer. The bracket includes a pin and the panels include a boss which slides over the pin. The brackets are simple and low cost and are permanently mounted trailers and the panels are easily removed and moved between trailers as desired.

In accordance with still another aspect of the invention, there are provided adjustable panels blocking the flow of cross-winds between a tractor and trailer. Adjustable struts are attached between the forward face of the trailer and the panels. The struts may be adjusted by threaded engagement of strut ends, or by telescoping ends using pins to fix the overall length of each strut, or attached by any apparatus allowing the length of the struts to be adjusted. Using pins to adjust the strut length is particularly advantageous by allowing quick adjustment where irregular surfaces cause large angular deflections between the tractor and trailer, or if weight on the axles needs to be adjusted the fifth wheel can be moved and the panels can be adjusted to provide the proper clearance gap between the tractor and trailer.

BRIEF DESCRIPTION OF THE SEVERAL VIEWS OF THE DRAWING

The above and other aspects, features and advantages of the present invention will be more apparent from the following more particular description thereof, presented in conjunction with the following drawings wherein:

FIG. 1A is side view of a tractor and trailer.

FIG. 1B is a top view of the tractor and trailer.

FIG. 2A is a side view of the tractor and trailer with cross-wind air foils according to the present invention.

FIG. 2B is a top view of the tractor and trailer with the cross-wind air foils according to the present invention.

FIG. 5 shows a panel boss and panel mounting bracket according to the present invention.

FIG. 5A shows a cross-sectional view of the panel boss according to the present invention taken along line 5A-5A of FIG. 5.

FIG. 6A shows a fixed length strut according to the present invention.

FIG. 6B shows a threaded adjustable length strut according to the present invention.

FIG. 6C shows a telescoping adjustable length strut according to the present invention.

FIG. 11A is a side view of the tractor and trailer with cross-wind air foils and bridging panel according to the present invention.

FIG. 11B is a top view of the tractor and trailer with the cross-wind air foils and the bridging panel according to the present invention.

FIG. 12A shows a side view of a collapsed adjustable length panel according to the present invention.

FIG. 12B shows a side view of an expanded adjustable length panel according to the present invention.

FIG. 13A shows a top view of the collapsed adjustable length panel according to the present invention.

FIG. 13B shows a top view of the expanded adjustable length panel according to the present invention.

FIG. 14A shows the collapsed adjustable length panels filling a small gap between a tractor and trailer according to the present invention.

FIG. 14B shows the expanded adjustable length panels filling a large gap between a tractor and trailer according to the present invention.

Corresponding reference characters indicate corresponding components throughout the several views of the drawings.

DETAILED DESCRIPTION OF THE INVENTION

Figure 3A:
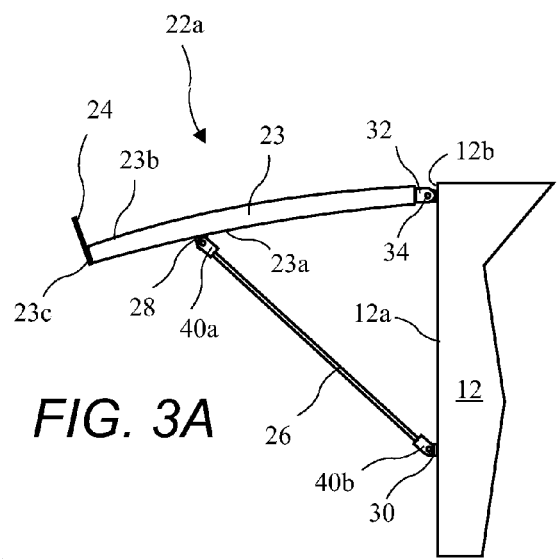
FIG. 3A is a more detailed top view of the cross-wind air foils according to the present invention.

The following description is of the best mode presently contemplated for carrying out the invention. This description is not to be taken in a limiting sense, but is made merely for the purpose of describing one or more preferred embodiments of the invention. The scope of the invention should be determined with reference to the claims.

A side view of a tractor 10 and trailer 12 is shown in FIG. 1A and a top view of the tractor 10 and trailer 12 is shown in FIG. 1B. A gap 14 exists between the tractor 10 and trailer 12 and a drag on the tractor 10 and trailer 12 is created when a cross-wind 20 is present. Air lines and electrical cables 16 supported by lines 18 reside in the gap 14 and connect the tractor 10 and trailer 12.

A side view of the tractor 10 and trailer 12 with cross-wind air foils according to the present invention comprising upper right and left panels 22a and lower right and left panels 22b are shown in FIG. 2A, and a top view of the tractor 10 and trailer 12 with the cross-wind air foils is shown in FIG. 2B. The cross-wind air foils block the cross-wind 20 to reduce drag and improve fuel efficiency of the tractor 10 and trailer 12. The panels 22a and 22b are held in position by struts 26 and include flaps 24 at forward ends which cooperate with side extenders 21 attached to the tractor 10 to provide improved blocking of the cross-wind 20.

Figure 3B:
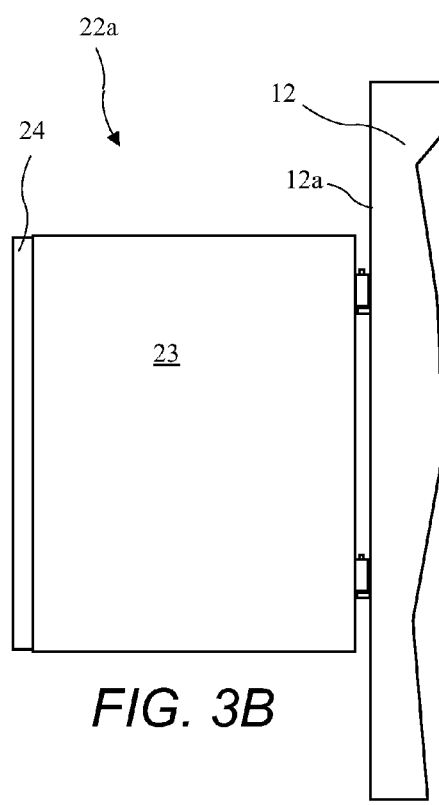
FIG. 3B is a more detailed outside view of the cross-wind air foils according to the present invention.
Figure 3C:
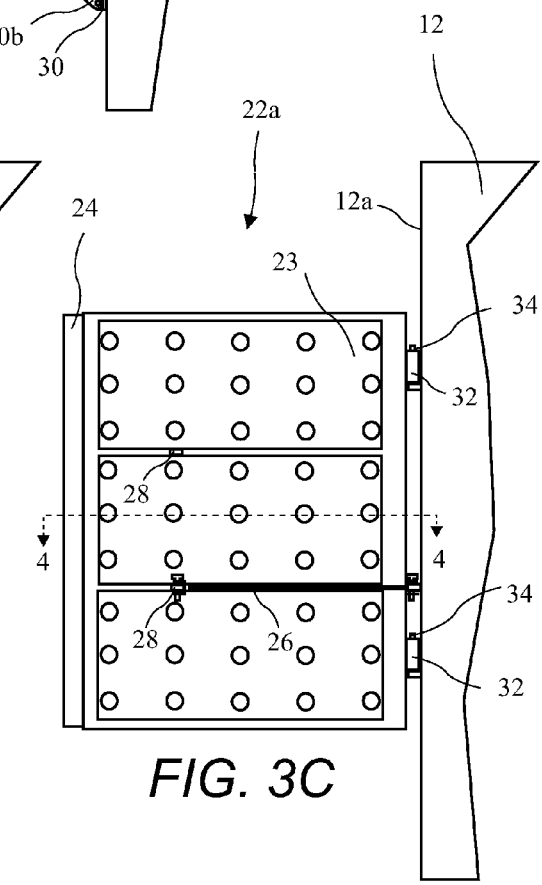
FIG. 3C is a more detailed inside view of the cross-wind air foils according to the present invention.

A more detailed top view of the cross-wind air foils according to the present invention is shown in FIG. 3A, a more detailed outside view of the cross-wind air foils is shown in FIG. 3B, and a more detailed inside view of the cross-wind air foils is shown in FIG. 3C. The panels 22a and 22b are pivotally attached to a forward face 12a of the trailer 12 near corners 12b of the forward face 12a. Panel bosses 32 of the panels 22a and 22b slide over pins 34 (also see FIG. 5) to pivotally attach the panels 22a, 22b to the trailer 12. The strut 26 includes a first clevis 40a pivotally attached to the strut boss 28 on the panels 22a, 22b and a second clevis 40b at an opposite end of the strut 26 pivotally attached to a clevis bracket 30 attached to the forward face 12a of the trailer 12.

Each panel 22a and 22b preferably includes two strut bosses 28 vertically positioned on the panel body 23 about one third of the panel height from the top and bottom of the panel respectively. The panels 22a, 22b are thus interchangeable from right to left and upper to lower. The strut 26 attached to the lower panel is generally attached using the lower strut boss 28 to allow easier access to the strut 26 for installation of the panels or adjustment of the panels.

Figure 4B:
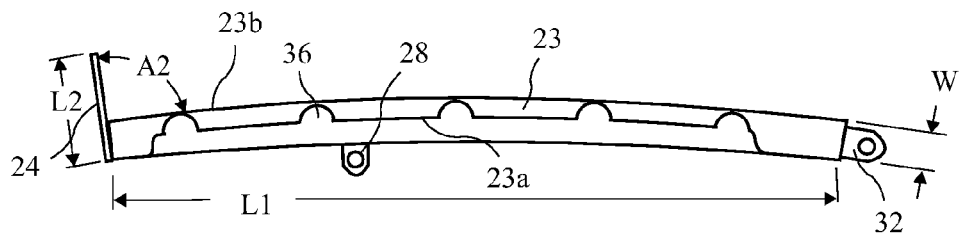
FIG. 4B is an top view of the panel according to the present invention.
Figure 4A:
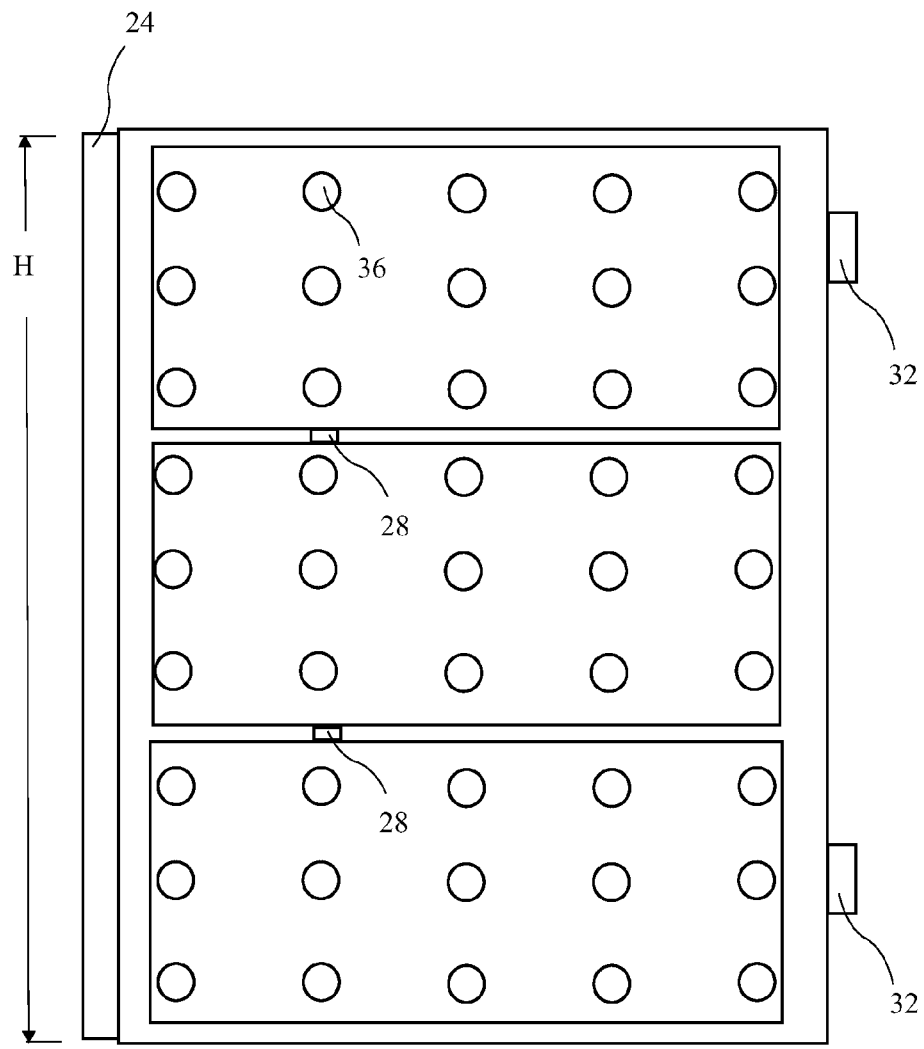
FIG. 4A is a detailed inside view of a panel according to the present invention.

A detailed inside view of the panels 22a and 22b according to the present invention is shown in FIG. 4A and an top view of the panels 22a and 22b is shown in FIG. 4B. The panels 22a and 22b include a panel body 23 preferably made from metal or plastic and more preferably made from plastic. The panels 22a and 22b may be formed by injection molding, rotational molding, blow molding, or the like, and preferably formed by rotational molding. Dimples 36 on the inside surface 23a of the panel body 23 reach to the outside surface 23b and add strength to the body 23. Additionally or alternatively, the body 23 may be foam filled.

The panels have a height H, a length L1, and a width (or thickness) W. The height H is preferably approximately 46 inches, the length L1 is preferably between approximately 36 inches and 48 inches, and the width W is preferably approximately five inches. The panels 22a and 22b are arced at between a 2.5 and 3 foot radius, with a smaller panel having a length L1 of approximately 36 inches arced over the entire length of the panel, and a larger panel larger having a length L1 of approximately 48 inches with an arced portion approximately 36 inches long followed by a straight portion approximately 12 inches long. Other panels may include an arced portion approximately 36 inches long followed by a straight portion between 1 and 12 inches long.

Flexible flaps 24 are attached to the forward end of the panels 22a and 22b. The flexible flaps 24 are at an angle A2 to the outer surface 23b of the panel body 23, where the angle A2 is preferably approximately 92 degrees. The flexible flaps 24 have approximately the same height H as the panel bodies 23 and have a length L2. The length L2 is preferably between approximately eight inches and approximately 12 inches. The flexible flaps 24 are preferably made from a hard rubber or other flexible material and are preferably attached to the panel bodies 23 by bolts but may be attached by any suitable means. The flexible flaps 24 may be positioned closer to the side extenders 21 without risk of damage because the flexible flaps 24 are somewhat flexible, and thereby improve the blocking of cross-winds 20 through the gap 14 (see FIG. 1b). The flexible flaps 24 are of particular value when the cross-winds and coming from near 90 degrees to the direction of the tractor and trailer to the rear of the trailer especially when wind velocities are in the category of 17 mph and above.

A panel boss 32 and panel mounting bracket 33 according to the present invention is shown attached to the forward face 12a of the trailer 12 in FIG. 5 and a cross-sectional view of the panel boss 32 taken along line 5A-5A of FIG. 5 is shown in FIG. 5A. Preferably, two brackets 33 are provided for each panel 22a and 22b. The vertical pin 34 is attached to the bracket 33 and the boss 32 slides down over the pin 34 to pivotally mount the panels 22a and 22b to the trailer 12. A clip 37 is insertable through a clip passage 37a to retain the panels 22a and 22b on the brackets 33.

A liner 31 is molded into the panel boss 32. The liner 31 comprises a tubular body 31a and projections 31b. The tubular body has a bore which slides over the pins 43 and the projections 31b help fix the position of the liner 31 in the boss 32. The projections 31b may be a variety of shapes and preferably have a polygonal cross-section and more preferably a hexagonal cross-section, and preferably has shared off top and bottom shoulders to better hold position in the boss 32. The liner 31 reinforces the boss 32 to facilitate attachment and separation from trailers without damaging the bosses 32.

Not all truck routes experience significant cross-winds so the air foil according to the present invention is not needed on all trailers at all times. The brackets 33 may be permanently attached to several trailers and the panels 22a and 22b may be swapped between trailers as needed. The simple attachment described above facilitates such swapping and reduces or eliminates the need to have a set of panels for each trailer.

A fixed length strut 26 according to the present invention is shown in FIG. 6A, a threaded adjustable length strut 26a according to the present invention is shown in FIG. 6B, and a telescoping adjustable length strut 26b according to the present invention is shown in FIG. 6C. The struts 26, 26a, and 26b include clevises 40a and 40b at each end for pivotal attachment to the panels 22a and 22b, and the forward face 12a of the trailer 12. The adjustable strut 26a comprises threaded inner and outer strut members 42a and 41a and a nut 44 for tightening to hold a desired length. The adjustable strut 26b includes telescoping drilled inner and outer strut members 42b and 41b and a clip 37 insertable through aligned passages 46a and 46b to hold a desired length.

Figure 7:
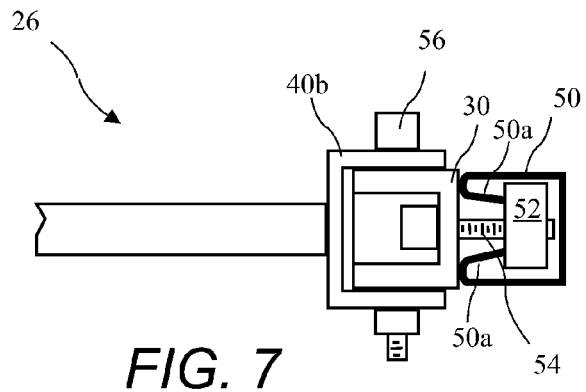
FIG. 7 shows a trailer end of the strut according to the present invention.

A trailer 12 end of the strut 26 is shown in FIG. 7 with an example of the clevis bracket 30. A short length of channel 50 is attached to the forward face 12a of the trailer 12. A bolt 54 passes through the clevis bracket 30, past lips 50a and into a captive threaded bar 52. The bolt 54 is tightened to attach the clevis bracket 30 to the channel 50. The channel 50 is merely an example of a method for attaching the strut 26 to the trailer 12, and an air foil according to the present invention utilizing any means for attaching the strut 26 to the trailer 12 is intended to come within the scope of the present invention.

Figure 8A:
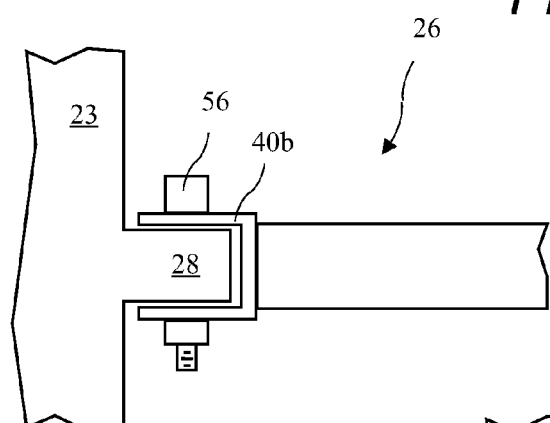
FIG. 8A shows a panel end of the strut according to the present invention attached to the panel by a bolt.
Figure 8B:
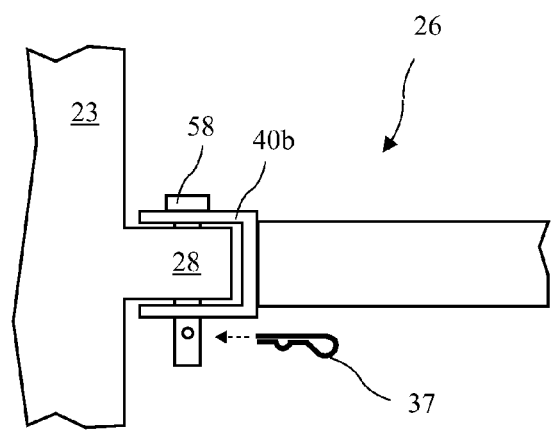
FIG. 8B shows a panel end of the strut according to the present invention attached to the panel by a pin and clip.

A panel end of the strut 26 pivotally attached to the panel boss 28 by a bolt 56 is shown in FIG. 8A and a panel end of the strut 26 pivotally attached to the panel boss by a pin 58 is shown in FIG. 8B. The pin 58 is held in place by the clip 37, and the strut 26 may be detached from the panel 22a or 22b very easily by merely pulling the clip 37 from the pin 58 and then removing the pin 58. The pin 58 and clip 37 are merely one example of a method for attaching the strut 26 to the panel 26, and an air foil according to the present invention utilizing any means for easily releaseably attaching the strut 26 to the panel 26 without tools is intended to come within the scope of the present invention.

Figure 9:
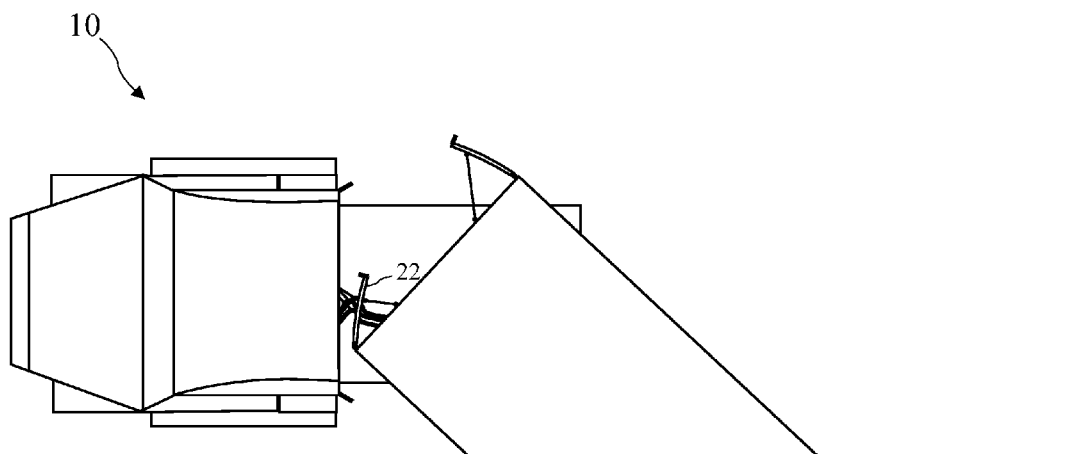
FIG. 9 shows a panel adjusted for a sharp turn according to the present invention.

A panel 22 is shown adjusted for a sharp turn in FIG. 9. The attachment of the strut 26 to the panel 22 shown in FIG. 8B and the adjustable struts 26a and 26b shown in FIGS. 6B and 6C allow an operator to easily release the strut from the panel, adjust the length of the strut, and reattach the strut. Such easy adjustment is important because tractor and trailer rigs are often required to make sharp maneuvers in yards, and making such adjustments quickly is important in meeting schedules.

Figure 10:
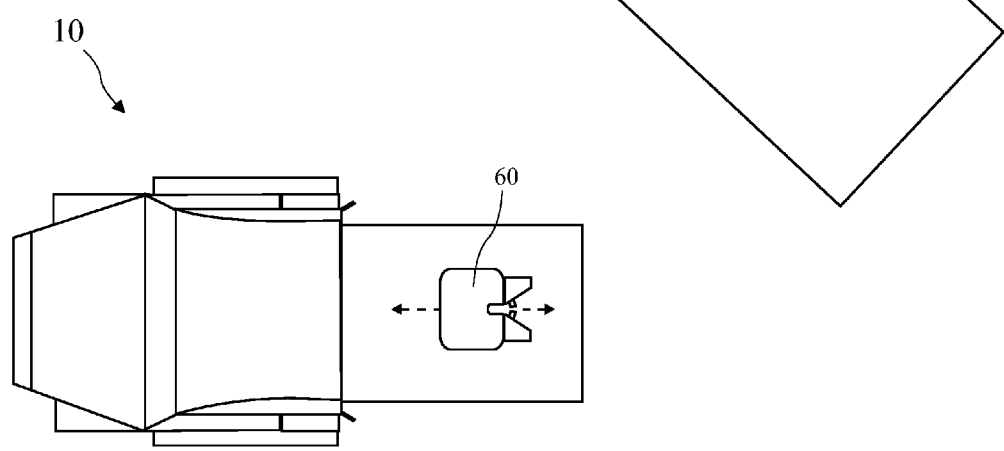
FIG. 10 shows an adjustable trailer plate.

A tractor 10 having an adjustable trailer plate 60 is shown in FIG. 10. The trailer plate 60 must often be adjusted forward or rearward based on the tongue weight of the trailer 12. When the trailer 12 is moved closer to the tractor 10, the panels 22a and 22b must be adjusted to provide clearance. The adjustable struts 26a and 26b allow for such adjustment.

A side view of the tractor 10 and trailer 12 with panels 22a and 22b and bridging panel 70 according to the present invention is shown in FIG. 11A and a top view of the tractor 10 and trailer 12 with the cross-wind air foils 22a and 22b and the bridging panel 70 is shown in FIG. 11B. While tractors 10 often have roof air foils 11 (see FIGS. 1A and 1B) mounted to the roof of the tractor 10 to deflect an air flow from the forward face 12a of the trailer 12, in some instances such air foils 11 are not easily attached to the tractors 10 and increased wind resistance results. In such instances a bridging panel 70 may be attached to top forward edges of the right and left panels 22a, sloping forward and downward, and filling in the gap 14 between the forward edges of the panels 22a. The bridging panel 70 reaches vertically from a height proximal to the roof 10a of the tractor 10 to a second height proximal to the top 12c of the trailer 12. A bridge panel 70 so attached provides the benefit of the roof air foil 11. The bridge panel 70 comprises three sections, a trapezoidal flat forward face, and triangular two side faces. The bridge panel 70 may be constructed from sheet metal or molded from plastic, having construction similar to the panels 22a and 22b.

The panels are preferably adjusted to provide at least approximately eight inches of clearance between the flaps and the stacks, side extenders, or other structure to avoid contact during turns.

A side view of a collapsed adjustable length panel 80 according to the present invention is shown in FIG. 12A, a side view of an expanded adjustable length panel 80 according to the present invention is shown in FIG. 12B, a top view of the collapsed adjustable length panel 80 according to the present invention is shown in FIG. 13A, and a top view of the expanded adjustable length panel 80 according to the present invention is shown in FIG. 13B. The adjustable length panels 80 include a first panel 80a attached to the trailer 12, and a second panel 80b slidably attached to the first panel 80a. Fasteners 84 may be tightened to fix the position of the second panel 80b with respect to the first panel 80a, and the panels 80a and 80b may include slots or tracks 82a and 82b respectively to hold an alignment of the panels 80a and 80b when the fasteners 84 are loosened and the panels 80a and 80b are being adjusted.

The adjustable length panel 80 may include two or more embodiments providing a length range from a collapsed length L3 of as small as 24 inches to an expanded length L4 of as much as 55 inches. An embodiment having a collapsed length of 24 inches may have an expanded length of about 40 inches providing an eight inch overlap of the panels 80a and 80b, and another embodiment having an extended length of 55 inches may have a collapsed length of 33 inches providing about a ten inch overlap of the panels 80a and 80b.

The collapsed adjustable length panels 80 filling a small gap between a tractor 10 and trailer 12 are shown in FIG. 14A and the expanded adjustable length panels 80 filling a large gap between a tractor 10 and trailer 12 are shown in FIG. 14B. The adjustable length panels 80 may thus be adjusted to fit a variety of tractor 10 and trailer combinations.

While the invention herein disclosed has been described by means of specific embodiments and applications thereof, numerous modifications and variations could be made thereto by those skilled in the art without departing from the scope of the invention set forth in the claims.

I claim:

1. A semi tractor and trailer fairing comprising:
   brackets attached to a forward face of the trailer near each front corner of the forward face;
   at least one adjustable length right panel and at least one adjustable length left panel residing in a gap between the tractor and trailer and configured to block a cross wind air flow between the tractor and the trailer, and attached to the brackets, the panels comprising a curved body, curving forward and inward towards the tractor;
   adjustable length struts reaching between the forward face of the trailer to an inner surface of each panel, wherein the panels are pivotally mounted to the brackets and positioned by the adjustable length struts, the adjustable length struts adjustable without detaching from the panels and the trailer, allowing the struts to be shortened to allow the panels to be easily folded inward to provide clearance for sharp maneuvers in yards; and
   flaps are attached to a forward edge of each panel, approximately perpendicular to an outer surface of each panel, the flaps extending outward with respect to the direction of travel of the semi tractor and trailer to further block the cross wind air flow between the tractor and the trailer.

2. The fairing of claim 1, wherein the adjustable length panels comprise an adjustable length lower right panel, an adjustable length upper right panel, an adjustable length lower left panel, and an adjustable length upper left panel.

3. The fairing of claim 2, wherein all four adjustable length panels are identical.

4. The fairing of claim 2, wherein all four adjustable length panels are interchangeable.

5. The fairing of claim 1, wherein the brackets including upward reaching bracket pins and the panels include bosses pivotally residing over the bracket pins, the panels pivotally mounted to the brackets by sliding the bosses down over the bracket pins.

6. The fairing of claim 5, wherein the bosses are secured on the bracket pins using clips residing through clip passages in the bracket pins.

7. The fairing of claim 6, wherein each panel includes at least two vertically spaced apart bosses, each boss pivotally residing over a corresponding bracket pin.

8. The fairing of claim 1, wherein the flaps are approximately eight inches long.

9. The fairing of claim 8, wherein the adjustable length panels are adjusted so that the outer edge of the flaps are at least eight inches from a rear edge of side extenders attached to the tractor cab.

10. The fairing of claim 9, wherein the adjustable length panels are pivotally adjusted by adjusting the length of the struts.

11. The fairing of claim 10, wherein the length of the struts are adjustable by telescopically sliding an inner strut member inside an outer strut member and inserting a strut clip through strut clip passages in both the inner and outer strut member.

12. The fairing of claim 10, wherein each adjustable length panel includes an upper strut boss and a lower strut boss allowing the adjustable length panel to be conveniently used on either the right or left side.

13. The fairing of claim 12, wherein the upper strut boss and a lower strut boss are vertically positioned about one third of the adjustable length panel height from the top and bottom of the panel respectively.

14. The fairing of claim 1, wherein the adjustable length panels reach generally forward from the face of the trailer towards rear corner edges of the tractor providing a gap of about eight inches between forward edges of the panels and the rear corner edges of the tractor.

15. A semi tractor and trailer fairing comprising:
    brackets attached to a forward face of the trailer near each front corner of the forward face;
    at least one adjustable length right panel and at least one adjustable length left panel residing in a gap between the tractor and trailer and configured to block a cross wind air flow between the tractor and the trailer, and attached to the brackets, the panels comprising a curved body, curving forward and inward towards the tractor;
    adjustable length struts reaching between the forward face of the trailer to an inner surface of each panel, wherein the panels are pivotally mounted to the brackets and positioned by the adjustable length struts, the adjustable length struts adjustable without detaching from the panels and the trailer, allowing the struts to be shortened to allow the panels to be easily folded inward to provide clearance for sharp maneuvers in yards; and
    a bridging panel attached to top forward edges of the upper right and left adjustable length panels, the bridging panel sloping downward and forward and filling in a gap between the forward edges of the panels, the bridging panel reaching vertically from a height proximal to the height of the roof of the tractor up to a second height proximal to the height of the top of the trailer.

16. The fairing of claim 15, wherein the bridging panel leaves a gap between top edges of the right and left adjustable length panels.

17. A semi tractor and trailer fairing comprising:
    brackets attached to a forward face of the trailer near each front corner of the forward face; and
    interchangeable lower right adjustable length panel, upper right adjustable length panel above the lower right adjustable length panel, lower left adjustable length panel, and upper left adjustable length panel above the lower left adjustable length panel residing in a gap between the tractor and trailer, each adjustable length panel pivotally attached to two of the brackets, each adjustable length panels comprising:

a curved body, curving forward and inward towards the tractor;

an upper strut boss and a lower strut boss vertically positioned about one third of the panel height from the top and bottom of the adjustable length panel respectively; and flaps attached to a forward edge of each adjustable length panel, the flaps extending outwards and approximately perpendicular to an outer surface of each adjustable length panel; and struts attached to the forward face of the trailer and to either the upper strut boss or the lower strut boss of each adjustable length panel.

\* \* \* \* \*